(12) United States Patent
Bischoff

(10) Patent No.: US 7,274,472 B2
(45) Date of Patent: Sep. 25, 2007

(54) RESOLUTION ENHANCED OPTICAL METROLOGY

(75) Inventor: Joerg Bischoff, Ilmenau (DE)

(73) Assignee: Timbre Technologies, Inc., Santa Clara, CA (US)

( * ) Notice: Subject to any disclaimer, the term of this patent is extended or adjusted under 35 U.S.C. 154(b) by 389 days.

(21) Appl. No.: 10/447,609

(22) Filed: May 28, 2003

(65) Prior Publication Data

US 2004/0239954 A1    Dec. 2, 2004

(51) Int. Cl.
| | |
|---|---|
| *G01B 11/02* | (2006.01) |
| *G01B 11/24* | (2006.01) |
| *G01B 11/30* | (2006.01) |
| *G01B 11/14* | (2006.01) |
| *G01N 21/86* | (2006.01) |
| *G01V 8/00* | (2006.01) |

(52) U.S. Cl. .................. 356/635; 356/601; 356/625; 250/559.19; 250/559.22; 250/559.24

(58) Field of Classification Search ............. None
See application file for complete search history.

(56) References Cited

U.S. PATENT DOCUMENTS

| 5,220,403 | A | * | 6/1993 | Batchelder et al. ......... 356/450 |
| 5,940,175 | A | * | 8/1999 | Sun ......................... 356/237.3 |
| 6,775,015 | B2 | * | 8/2004 | Bischoff et al. ............. 356/636 |
| 6,785,638 | B2 | | 8/2004 | Niu et al. | |
| 6,891,626 | B2 | | 5/2005 | Niu | |
| 6,934,024 | B2 | * | 8/2005 | Zhan et al. .................. 356/369 |
| 6,943,400 | B2 | | 9/2005 | Manabe | |
| 6,943,900 | B2 | * | 9/2005 | Niu et al. .................... 356/625 |
| 2003/0184761 | A1 | * | 10/2003 | Degertekin et al. ......... 356/511 |

\* cited by examiner

*Primary Examiner*—Gregory J. Toatley, Jr.
*Assistant Examiner*—Gordon J. Stock, Jr.
(74) *Attorney, Agent, or Firm*—Morrison & Foerster LLP

(57) ABSTRACT

A resolution enhanced optical metrology system to examine a structure formed on a semiconductor wafer includes a source configured to direct an incident beam at the structure through a coupling element. The coupling element is disposed between the source and the structure with a gap having a gap height defined between the coupling element and the structure.

45 Claims, 10 Drawing Sheets

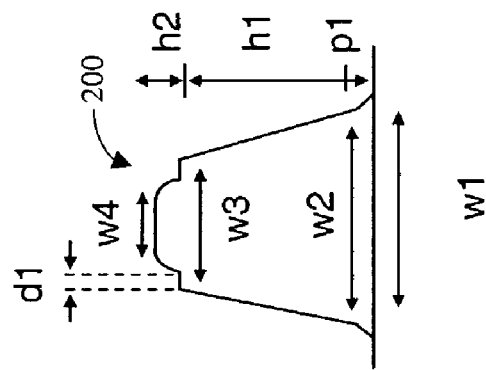
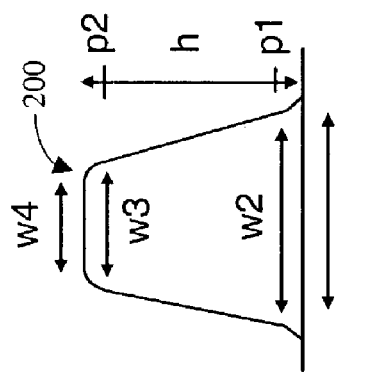
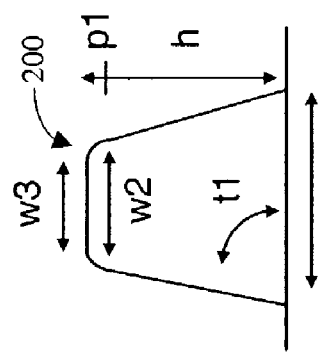
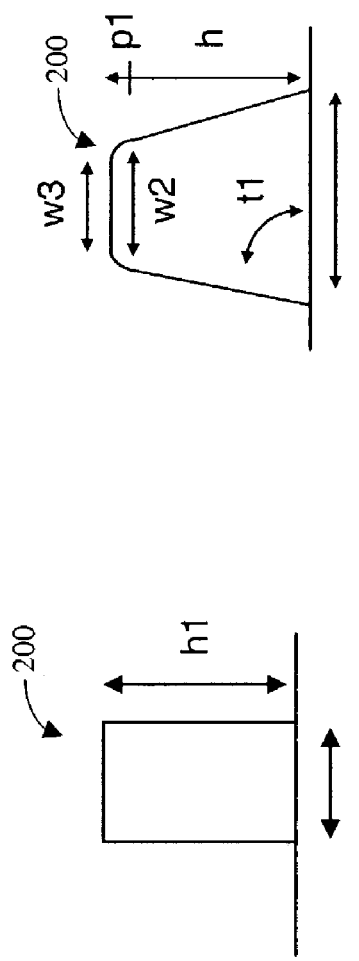
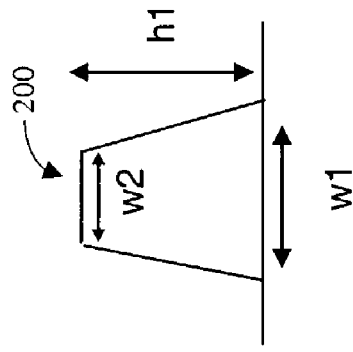

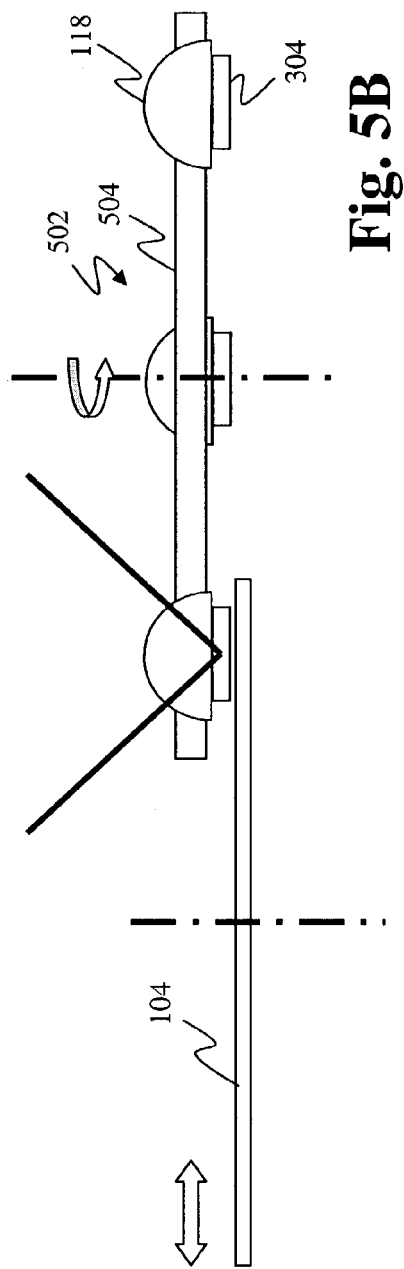
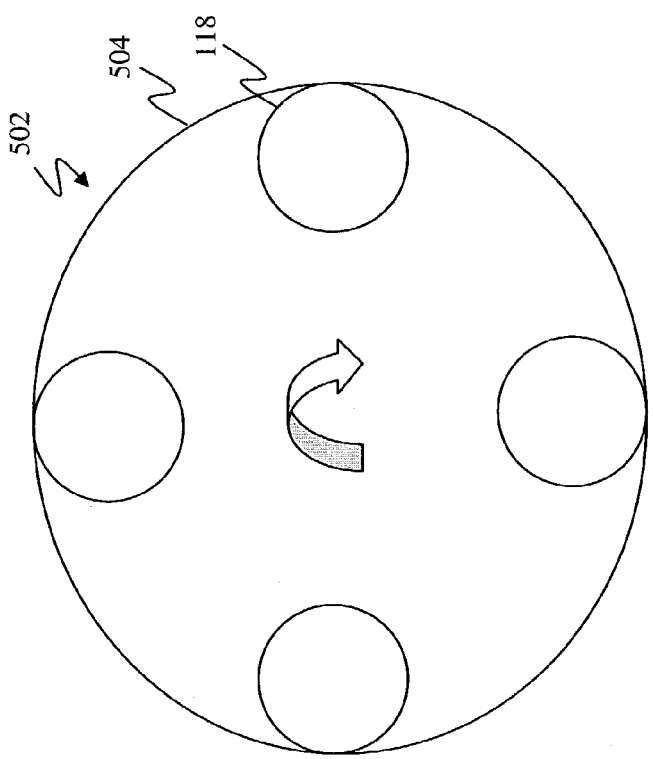
Fig. 5B
Fig. 5A

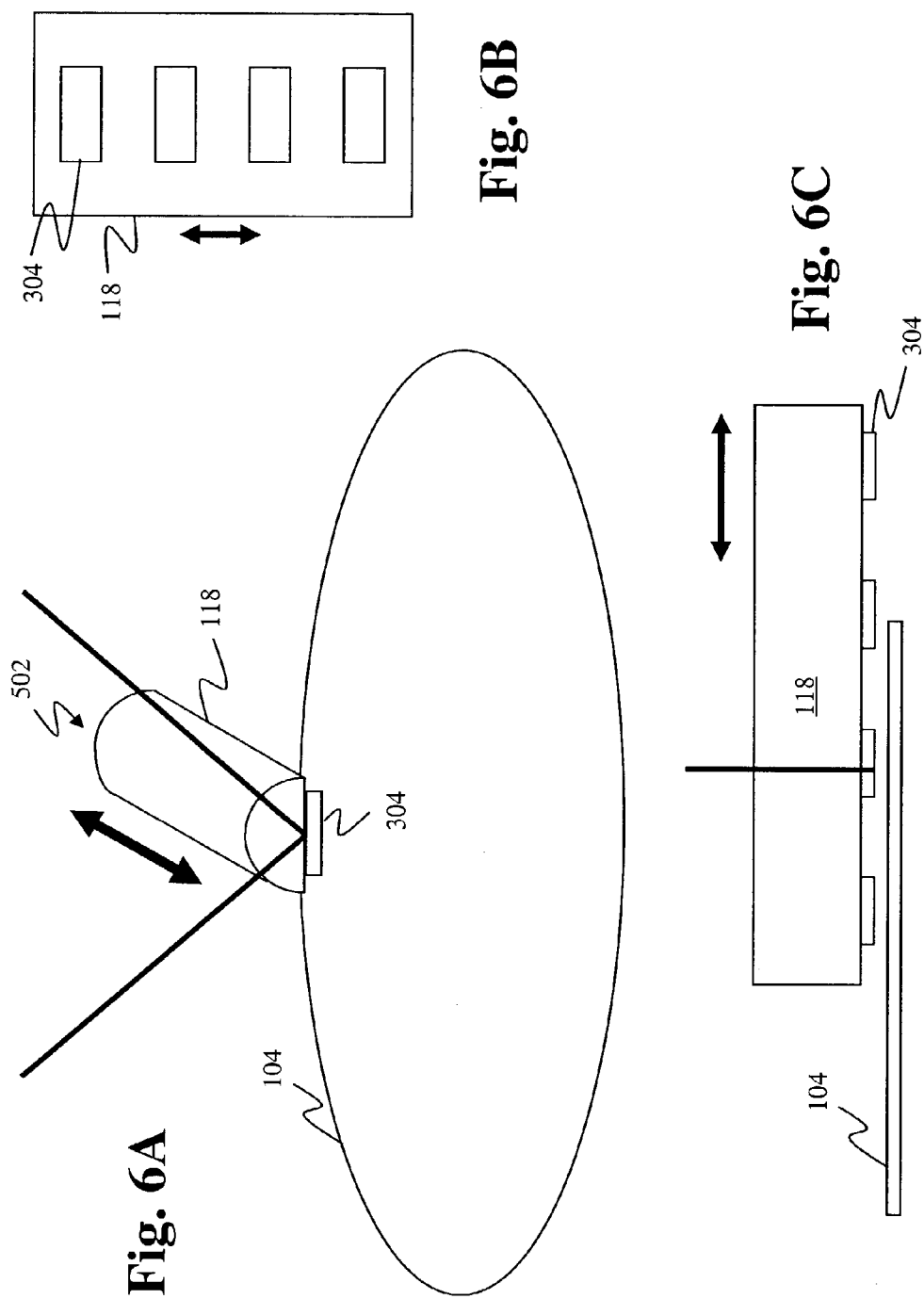

RESOLUTION ENHANCED OPTICAL METROLOGY

BACKGROUND

1. Field of the Invention

The present invention relates to optical metrology, and more particularly to resolution enhanced optical metrology.

2. Related Art

Optical metrology involves directing an incident beam at a structure, measuring the resulting diffracted beam, and analyzing the diffracted beam to determine various characteristics, such as the profile of the structure. In semiconductor manufacturing, optical metrology is typically used for quality assurance. For example, after fabricating a periodic grating in proximity to a semiconductor chip on a semiconductor wafer, an optical metrology system is used to determine the profile of the periodic grating. By determining the profile of the periodic grating, the quality of the fabrication process utilized to form the periodic grating, and by extension the semiconductor chip proximate the periodic grating, can be evaluated.

However, the resolution of conventional optical metrology may be limited. More particularly, consider a structure with a pitch p that is illuminated obliquely under a certain incidence angle $\theta_i$. With the wavelength $\lambda$ of the illumination, the diffraction order m propagates in a direction $\theta_m$ that can be computed by the grating equation in reflection:

$$-\sin\theta_m = \sin\theta_i + m \cdot \frac{\lambda}{p} \quad (1)$$

The signs characterize the oppositeness of the angles, e.g., the zero reflection order propagates in $-\theta_i$ direction. Now, assume that the incident angle is chosen such that the diffraction in the minus first order is symmetric to the specular reflected beam, i.e., $\theta_0 = -\theta_i = -\theta_{-1}$. Then, the following is obtained from equation (1):

$$\sin\theta_i = \frac{\lambda}{2p} \quad (2)$$

Assuming that the structure is imaged by a lens with an aperture angle u and the lens is diffraction limited, the image resolution increases with increasing numerical aperture or aperture angle u of the lens with the theoretical limit u=90°. Inserting this value in equation (2), the Abbe resolution limit follows as:

$$p = \frac{\lambda}{2} \quad (3)$$

Theoretical and experimental investigations have shown that depending on the geometry and material of the structure, 3σ measurement precision less than 1% can be obtained for conventional optical metrology for structures with a minimum pitch p of:

$$p = \frac{\lambda}{M} \quad (4)$$

where M is a real number, such as 3. However, feature geometries may shrink below this resolution limit.

SUMMARY

In one exemplary embodiment, a resolution enhanced optical metrology system to examine a structure formed on a semiconductor wafer includes a source configured to direct an incident beam at the structure through a coupling element. The coupling element is disposed between the source and the structure with a gap having a gap height defined between the coupling element and the structure.

DESCRIPTION OF DRAWING FIGURES

The present invention can be best understood by reference to the following description taken in conjunction with the accompanying drawing figures, in which like parts may be referred to by like numerals:

FIGS. 2A–2E depict exemplary profiles of an exemplary periodic grating;

FIG. 5A is a top view of an assembly having four coupling elements;

FIG. 5B is a side view of the assembly depicted in FIG. 5A;

FIG. 6A is a perspective view of a coupling element having two or more diffractive elements;

FIG. 6B is a bottom view of the coupling element depicted in FIG. 6A;

FIG. 6C is a side view of the coupling element depicted in FIG. 6A;

Figure 11:
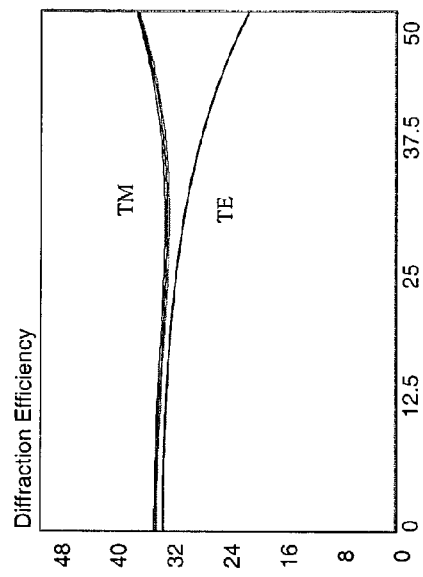
Figure 13:
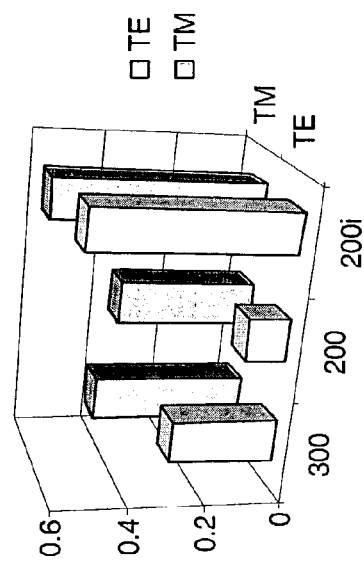
Figure 10:
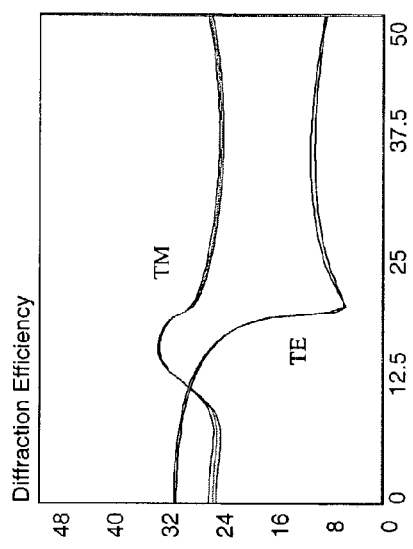
Figure 12:
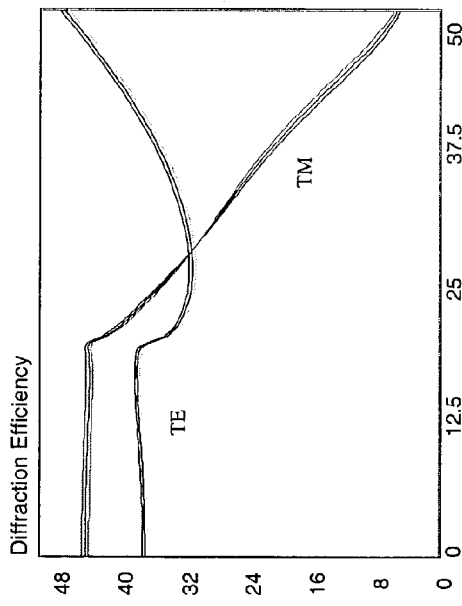
Figure 15:
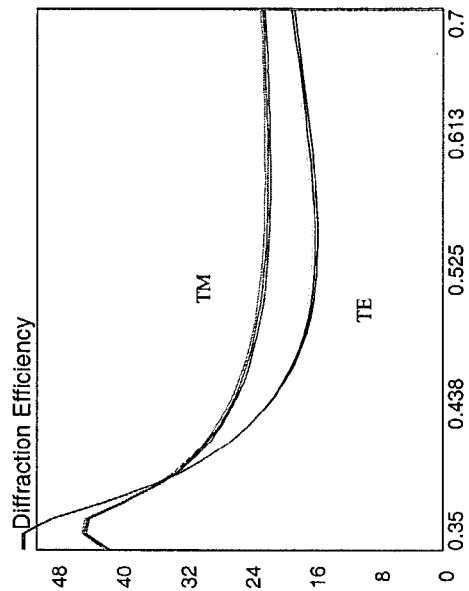
Figure 14:
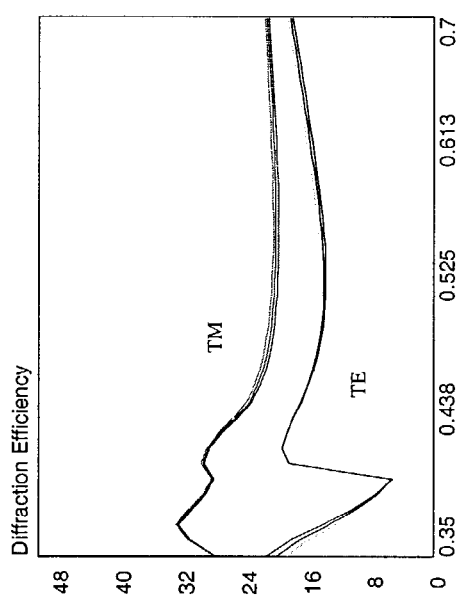
Figure 16:
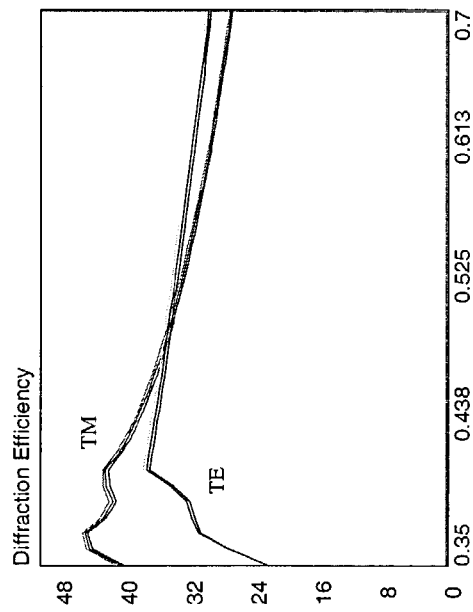

FIGS. 10, 11, and 12 depict modeled optical signatures;

FIG. 13 depicts average sensitivity values;

FIGS. 14, 15, and 16 depict modeled optical signatures; and

Figure 18:
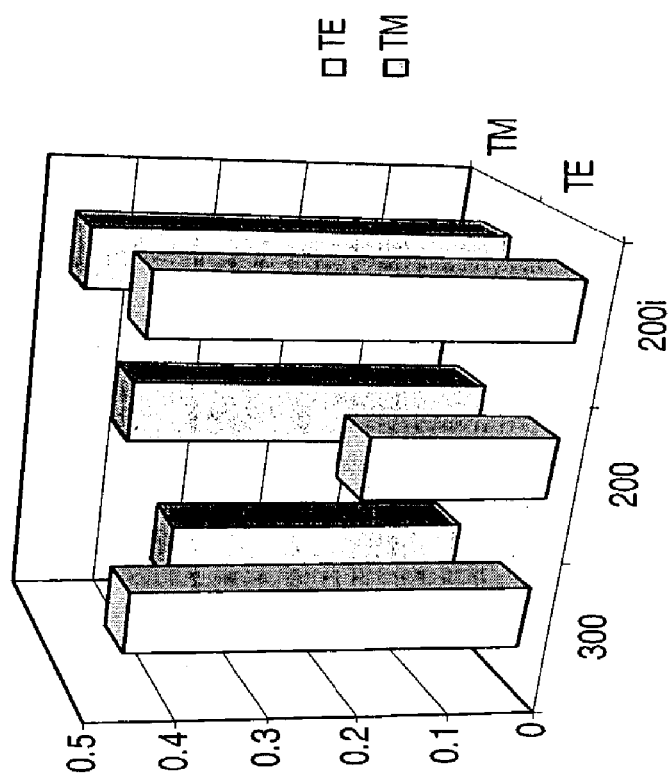
Figure 17:
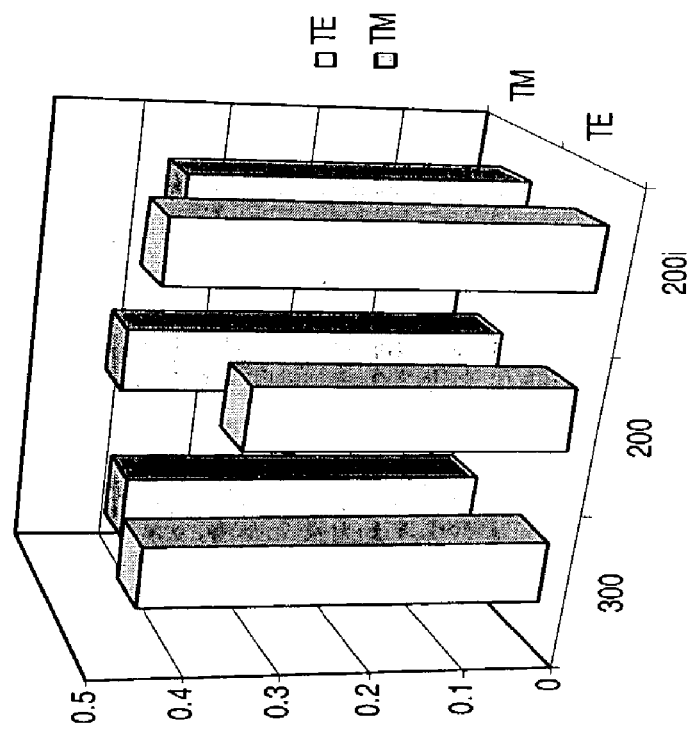

FIGS. 17 and 18 depict average sensitivity values.

DETAILED DESCRIPTION

The following description sets forth numerous specific configurations, parameters, and the like. It should be recognized, however, that such description is not intended as a limitation on the scope of the present invention, but is instead provided as a description of exemplary embodiments.

1. Optical Metrology

Figure 1:
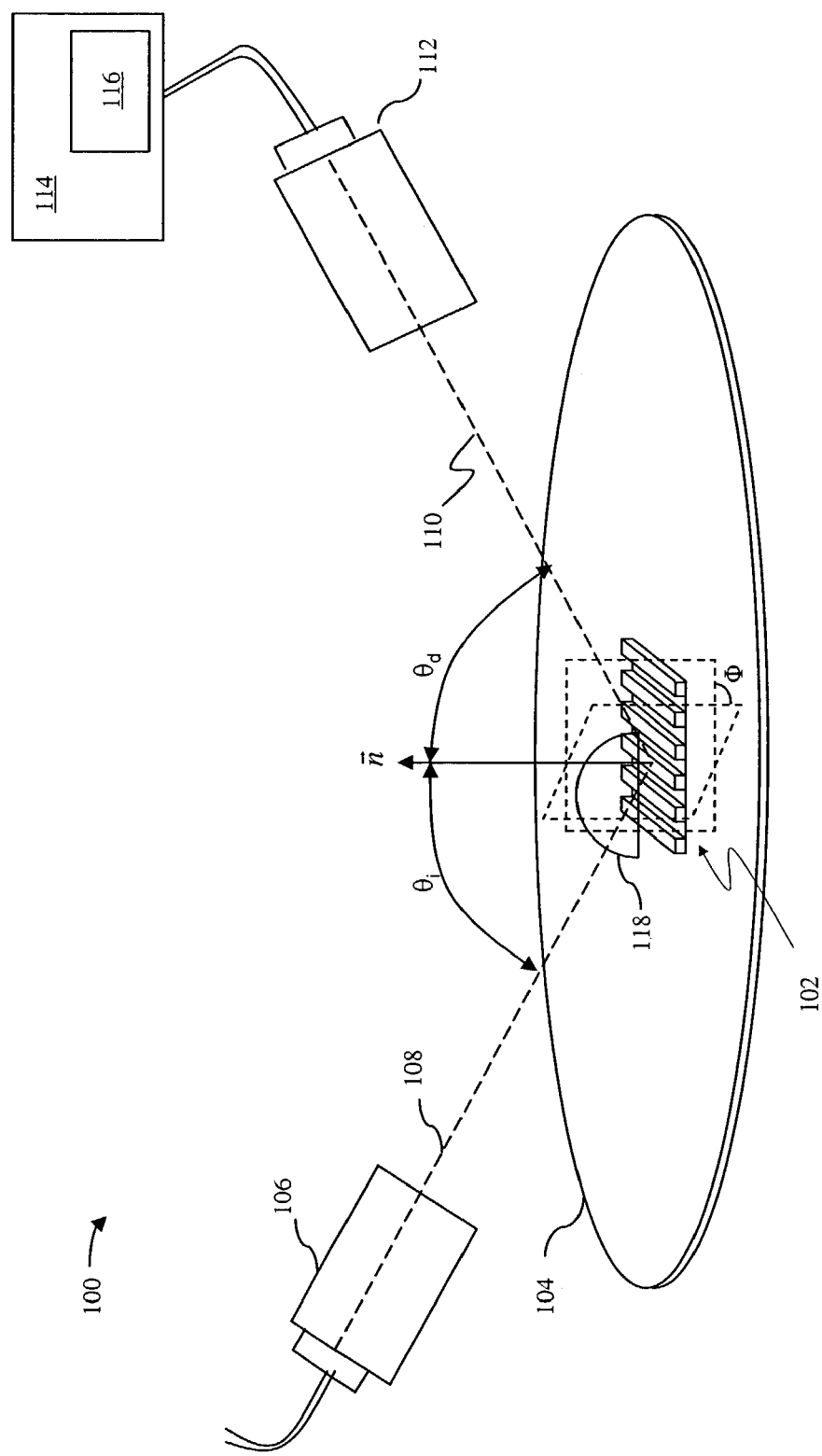
FIG. 1 depicts an exemplary optical metrology system with a coupling element.

With reference to FIG. 1, an optical metrology system 100 can be used to examine and analyze a structure. For example, optical metrology system 100 can be used to determine the profile of a periodic grating 102 formed on wafer 104. As described earlier, periodic grating 102 can be formed in test areas on wafer 104, such as adjacent to a device formed on wafer 104. Alternatively, periodic grating 102 can be formed in an area of the device that does not interfere with the operation of the device or along scribe lines on wafer 104.

As depicted in FIG. 1, optical metrology system 100 can include a photometric device with a source 106 and a detector 112. Periodic grating 102 is illuminated by an incident beam 108 from source 106. In the present exemplary embodiment, incident beam 108 is directed onto periodic grating 102 at an angle of incidence $\theta_i$ with respect to normal $\vec{n}$ of periodic grating 102 and an azimuth angle $\Phi$ (i.e., the angle between the plane of incidence beam 108 and the direction of the periodicity of periodic grating 102). Diffracted beam 110 leaves at an angle of $\theta_d$ with respect to normal $\vec{n}$ and is received by detector 112. Detector 112 converts the diffracted beam 110 into a measured diffraction signal.

To determine the profile of periodic grating 102, optical metrology system 100 includes a processing module 114 configured to receive the measured diffraction signal and analyze the measured diffraction signal. As described below, the profile of periodic grating 102 can then be determined using a library-based process or a regression-based process. Additionally, other linear or non-linear profile extraction techniques are contemplated.

2. Library-Based Process of Determining Profile of Structure

In a library-based process of determining the profile of a structure, the measured diffraction signal is compared to a library of simulated diffraction signals. More specifically, each simulated diffraction signal in the library is associated with a hypothetical profile of the structure. When a match is made between the measured diffraction signal and one of the simulated diffraction signals in the library or when the difference of the measured diffraction signal and one of the simulated diffraction signals is within a preset or matching criterion, the hypothetical profile associated with the matching simulated diffraction signal is presumed to represent the actual profile of the structure. The matching simulated diffraction signal and/or hypothetical profile can then be utilized to determine whether the structure has been fabricated according to specifications.

Thus, with reference again to FIG. 1, in one exemplary embodiment, after obtaining a measured diffraction signal, processing module 114 then compares the measured diffraction signal to simulated diffraction signals stored in a library 116. Each simulated diffraction signal in library 116 can be associated with a hypothetical profile. Thus, when a match is made between the measured diffraction signal and one of the simulated diffraction signals in library 116, the hypothetical profile associated with the matching simulated diffraction signal can be presumed to represent the actual profile of periodic grating 102.

The set of hypothetical profiles stored in library 116 can be generated by characterizing a hypothetical profile using a set of parameters, then varying the set of parameters to generate hypothetical profiles of varying shapes and dimensions. The process of characterizing a profile using a set of parameters can be referred to as parameterizing.

For example, as depicted in FIG. 2A, assume that hypothetical profile 200 can be characterized by parameters h1 and w1 that define its height and width, respectively. As depicted in FIGS. 2B to 2E, additional shapes and features of hypothetical profile 200 can be characterized by increasing the number of parameters. For example, as depicted in FIG. 2B, hypothetical profile 200 can be characterized by parameters h1, w1, and w2 that define its height, bottom width, and top width, respectively. As depicted in FIG. 2C, hypothetical profile 200 can be characterized by parameters h, w1, w2, w3, t1, and p1. As depicted FIG. 2D, hypothetical profile 200 can be characterized by parameters h, w1, w2, w3, w4, p1, and p2. As depicted in FIG. 2E, hypothetical profile 200 can be characterized by parameters h1, h2, w1, w2, w3, w4, p1, and d1. Note that the width of hypothetical profile 200 can be referred to as the critical dimension (CD). For example, in FIG. 2B, parameter w1 and w2 can be described as defining the bottom CD and top CD, respectively, of hypothetical profile 200.

As described above, the set of hypothetical profiles stored in library 116 (FIG. 1) can be generated by varying the parameters that characterize the hypothetical profile. For example, with reference to FIG. 2B, by varying parameters h1, w1, and w2, hypothetical profiles of varying shapes and dimensions can be generated. Note that one, two, or all three parameters can be varied relative to one another.

With reference again to FIG. 1, the number of hypothetical profiles and corresponding simulated diffraction signals in the set of hypothetical profiles and simulated diffraction signals stored in library 116 (i.e., the resolution and/or range of library 116) depends, in part, on the range over which the set of parameters and the increment at which the set of parameters are varied. In one exemplary embodiment, the hypothetical profiles and the simulated diffraction signals stored in library 116 are generated prior to obtaining a measured diffraction signal from an actual structure. Thus, the range and increment (i.e., the range and resolution) used in generating library 116 can be selected based on familiarity with the fabrication process for a structure and what the range of variance is likely to be. The range and/or resolution of library 116 can also be selected based on empirical measures, such as measurements using AFM, X-SEM, and the like.

For a more detailed description of a library-based process, see U.S. patent application Ser. No. 09/907,488, titled GENERATION OF A LIBRARY OF PERIODIC GRATING DIFFRACTION SIGNALS, filed on Jul. 16, 2001, which is incorporated herein by reference in its entirety.

3. Regression-based Process of Determining Profile of Structure

In a regression-based process of determining the profile of a structure, the measured diffraction signal is compared to a simulated diffraction signal (i.e., a trial diffraction signal). The simulated diffraction signal is generated prior to the comparison using a set of parameters (i.e., trial parameters) for a hypothetical profile (i.e., a hypothetical profile). If the measured diffraction signal and the simulated diffraction signal do not match or when the difference of the measured diffraction signal and one of the simulated diffraction signals is not within a preset or matching criterion, another simulated diffraction signal is generated using another set of parameters for another hypothetical profile, then the measured diffraction signal and the newly generated simulated diffraction signal are compared. When the measured diffraction signal and the simulated diffraction signal match or when the difference of the measured diffraction signal and one of the simulated diffraction signals is within a preset or matching criterion, the hypothetical profile associated with the matching simulated diffraction signal is presumed to represent the actual profile of the structure. The matching simulated diffraction signal and/or hypothetical profile can then be utilized to determine whether the structure has been fabricated according to specifications.

Thus, with reference again to FIG. 1, in one exemplary embodiment, processing module 114 can generate a simulated diffraction signal for a hypothetical profile, and then compare the measured diffraction signal to the simulated diffraction signal. As described above, if the measured diffraction signal and the simulated diffraction signal do not match or when the difference of the measured diffraction signal and one of the simulated diffraction signals is not within a preset or matching criterion, then processing module 114 can iteratively generate another simulated diffraction signal for another hypothetical profile. In one exemplary embodiment, the subsequently generated simulated diffraction signal can be generated using an optimization algorithm, such as global optimization techniques, which includes simulated annealing, and local optimization techniques, which includes steepest descent algorithm.

In one exemplary embodiment, the simulated diffraction signals and hypothetical profiles can be stored in a library 116 (i.e., a dynamic library). The simulated diffraction signals and hypothetical profiles stored in library 116 can then be subsequently used in matching the measured diffraction signal.

For a more detailed description of a regression-based process, see U.S. patent application Ser. No. 09/923,578, titled METHOD AND SYSTEM OF DYNAMIC LEARNING THROUGH A REGRESSION-BASED LIBRARY GENERATION PROCESS, filed on Aug. 6, 2001, which is incorporated herein by reference in its entirety.

4. Rigorous Coupled Wave Analysis

As described above, simulated diffraction signals are generated to be compared to measured diffraction signals. In one exemplary embodiment, simulated diffraction signals can be generated by applying Maxwell's equations and using a numerical analysis technique to solve Maxwell's equations, such as rigorous coupled-wave analysis (RCWA). It should be noted, however, that various numerical analysis techniques, including variations of RCWA, can be used. For a more detail description of RCWA, see U.S. patent application Ser. No. 09/770,997, titled CACHING OF INTRA-LAYER CALCULATIONS FOR RAPID RIGOROUS COUPLED-WAVE ANALYSES, filed on Jan. 25, 2001, which is incorporated herein by reference in its entirety.

5. Optical Metrology with Coupling Element

Figure 3A:
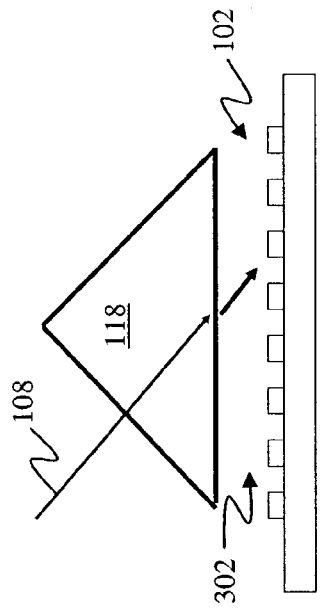
FIGS. 3A to 3D depict exemplary coupling elements.

With reference again to FIG. 1, in one exemplary embodiment, a coupling element 118 is disposed between source 106 and structure 102. With reference to FIG. 3A, coupling element 118 is disposed proximate to structure 102 with a gap 302 between coupling element 118 and structure 102. Note that gap 302 is defined between the surface of coupling element 118 facing structure 102 and the base of structure 102. Thus, coupling element 118 can contact the top of structure 102.

In FIG. 3A, coupling element 118 is depicted as a coupling lens. When coupling element 118 is a coupling lens, to reduce spherical aberrations, the coupling lens is configured to meet aplanatic conditions, meaning that no additional spherical aberrations are introduced (i.e., the coupling element does not cause additional phase differences in the incident beam).

Figure 3B:
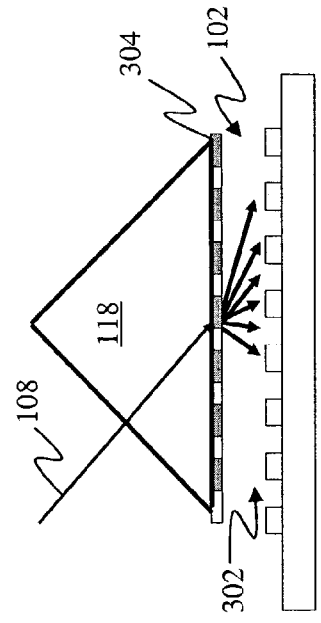

Although coupling element 118 is depicted in FIG. 3A as a semi-sphere lens, it should be recognized, as depicted in FIG. 3B, that coupling element 118 can also be a prism. However, when coupling element 118 is a coupling lens rather than a prism, various angles of incidents can be used, such as in angle resolved scatterometry.

Figure 4:
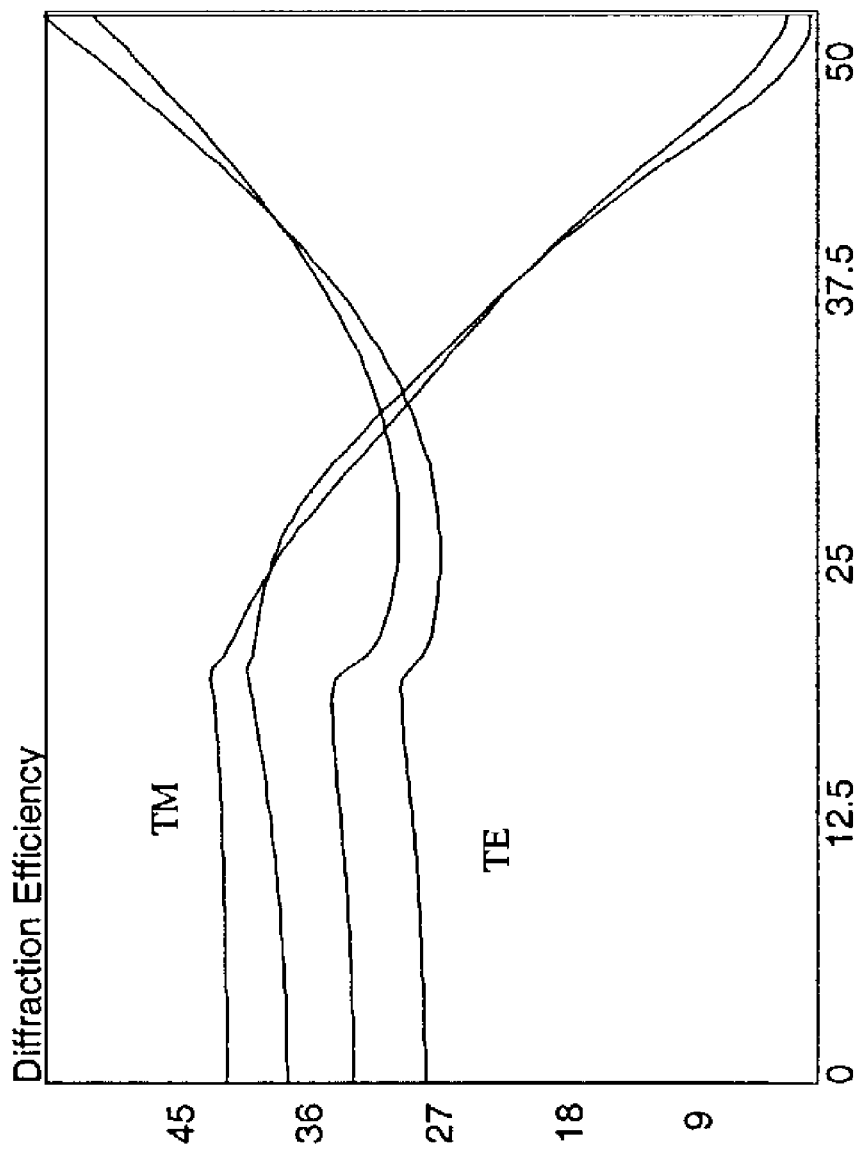
FIG. 4 depicts changes in TM and TE signals corresponding to changes in gap height.

With reference again to FIG. 3A, to enable the tunneling of evanescent waves of incident beam 108, in the present exemplary embodiment, gap 302 does not exceed the wavelength of incident beam 108. FIG. 4 illustrates a simulation of changes in TM and TE signals corresponding to changes in gap height (the curves in FIG. 4 were simulated for gap heights of 10 nm and 20 nm). As depicted in FIG. 4, small changes in gap height can result in large changes to the TM and TE signals.

With reference again to FIG. 3A, gap 302 can be filled with various media. For example, gap 302 can be filled with a gas (e.g., air, nitrogen, and the like). Alternatively, gap 302 can be filled with a liquid (e.g., de-ionized water, glycerin, immersion oil, and the like). In one preferred embodiment, to reduce the effect of a gap change on the diffraction signal, the refraction index of coupling element 118 and the refraction index of the medium filling gap 302 are approximately the same or the difference is reduced. In the present exemplary embodiment, coupling element 118 has a refraction index n.

Additionally, when gap 302 is filled with a liquid, the liquid can be used in processing of the structure, such as in cleaning or other wet processing of the structure. For example, during a develop or etch process, the chemical solvents used in the develop or etch process can concurrently act as the media that fills gap 302.

The grating equation in reflection with the use of coupling element 118 with a refraction index of n becomes:

It should be recognized that equation (7) is an estimate rather than a quantitative measure. The actual resolution may depend on a variety of different excitation and detection parameters as well as on the sample geometry and morphology.

Figure 3C:
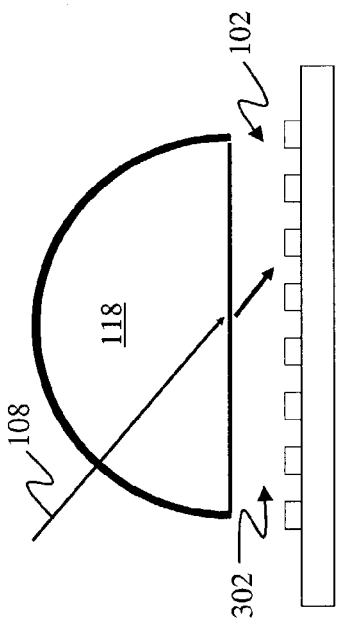
Figure 3D:
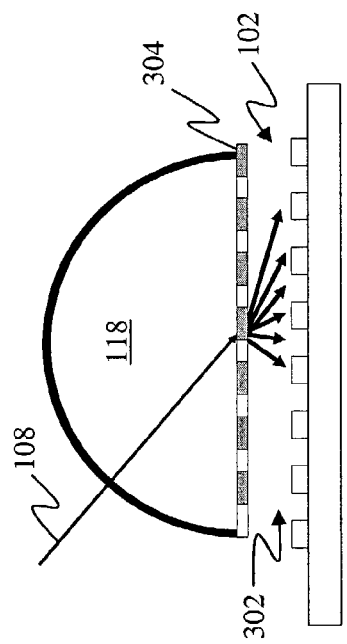

With reference to FIG. 3C, in another exemplary embodiment, coupling element 118 includes a diffractive element 304. In FIG. 3C coupling element 118 is depicted as a coupling lens. However, with reference to FIG. 3D, coupling element 118 can be a coupling prism.

With reference again to FIG. 3C, diffractive element 304 can be formed as various known structures using various known techniques. For example, diffractive element 304 can be formed as a transmission grating, such as chromium lines, or as a phase grating, such as etched groves in a fused silica. Additionally, diffractive element 304 can be blazed, such as in an asymmetric saw-tooth profile, to direct the incoming energy in a higher diffraction order.

As depicted in FIG. 3C, diffractive element 304 diffracts and thus disperses incident beam 108 in several directions, which may be determined by a general grating equation or the like. In this manner, structure 102 is excited by a discrete spectrum of incident beams instead of one single ("zero order") beam. Additionally, because gap 302 does not exceed the wavelength of incident beam 108, this spectrum is not restricted to propagation orders. Likewise, evanescent orders can tunnel gap 302 and excite structure 102.

In the present exemplary embodiment, diffractive element 304 can be adapted to maximize measurement sensitivity for different types of structures 102. More particularly, the pitch of diffractive element 304 is adapted to the pitch of structure 102. For example, in one exemplary embodiment, the pitch of diffractive element 304 and the pitch of structure 102 are approximately the same or the difference is approximately an integer ratio (m:n).

Although structure 102 has been described as having a pitch, it should be recognized that structure 102 is not limited to periodic structures. For example, structure 102 can be an array of holes or vias.

Additionally, two or more coupling elements can be integrated in an assembly, where the optimum coupling element is selected for a particular structure to be examined. For example, with reference to FIGS. 5A and 5B, an assembly 502 includes two or more coupling elements 118 mounted on a mounting plate 504 with each coupling element 118 having a diffractive element 304 adapted for a different type of structure. Thus, the appropriate diffractive element on the appropriate coupling element can be selected from assembly 502 based on the structure to be examined.

Alternatively, two or more diffractive elements can be mounted on a coupling element. For example, with reference to FIGS. 6A, 6B, and 6C, assembly 502 can include two or more diffractive elements 304 mounted on coupling element 118. Each diffractive element 304 on assembly 502 can be adapted for a different type of structure. Thus, the appropriate diffractive element can be selected from assembly 502 based on the structure to be examined.

For example, as noted above, in one exemplary embodiment, the pitch of the diffractive element and the pitch of the structure are approximately the same or the difference is approximately an integer ratio. Thus, the coupling elements can have varying pitches and the coupling element with a pitch that is either approximately the same or approximately an integer ratio of the pitch of the structure to be examined is selected.

As described above, in a library-based process and regression-based process of determining the profile of a structure, simulated diffraction signals are generated to be compared to measured diffraction signals. Thus, when a coupling element is used, the properties of the coupling element (e.g., the refraction index n of the coupling element) and the amount of the gap between the coupling element and the structure are taken into account in generating the simulated diffraction signals. Additionally, when the coupling element includes a diffractive element, the properties of the diffractive element (e.g., the pitch of the diffractive element) are taken into account in generating the simulated diffraction signals. Note that the pitch of the diffractive element can be obtained using optical metrology or a non-optical technique, such as atomic force microscopy (AFM).

As described above, small changes in the amount of the gap between the coupling element and the structure being examined can produce large changes in the measurements obtained using the coupling element. Additionally, the amount of the gap is taken into account (e.g., as an additional parameter) in generating simulated diffraction signals for use in a library-based process and regression-based process of determining the profile of a structure.

Figure 7A:
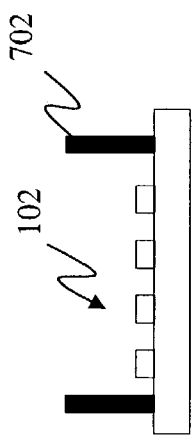
FIG. 7A is a side view of an exemplary alignment structure.
Figure 7B:
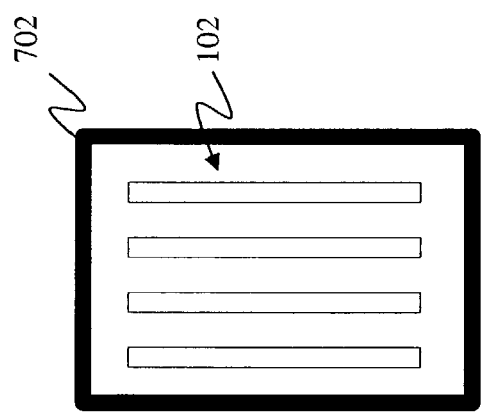
FIG. 7B is a top view of an exemplary alignment structure.

Thus, in one exemplary embodiment, with reference to FIGS. 7A and 7B, one or more alignment structures 702 with a known height is formed adjacent to the structure to be examined (e.g., structure 102). Thus, the desired gap between the coupling element and structure 102 can be established and known by positioning the coupling element on alignment structure 702.

Although in FIG. 7B, alignment structure 702 is depicted as a frame surrounding structure 102, it should be recognized that alignment structure 702 can be formed as various shapes and structures. For example, alignment structure 702 can be formed as one or more posts formed adjacent to structure 102. Additionally, although structure 102 is depicted in FIG. 7B as a plurality of lines, it should be recognized that structure 102 can include various shapes and structures. For example, structure 102 can be a hole or vias.

Figure 8:
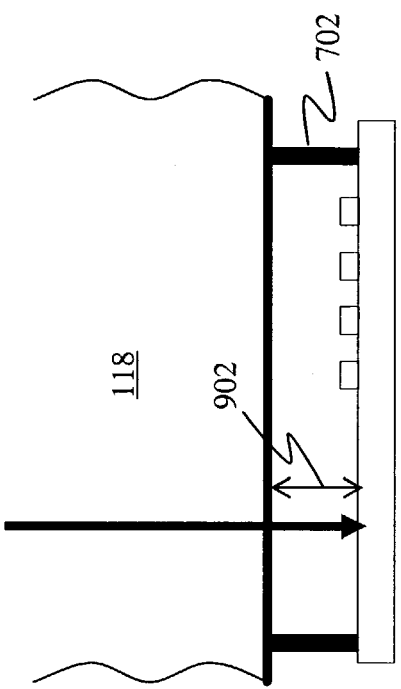
FIG. 8 depicts an exemplary unpatterned area adjacent a structure formed on a semiconductor wafer.
Figure 9:
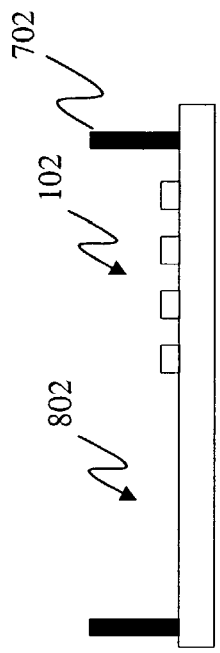
FIG. 9 depicts an exemplary coupling element positioned above the unpatterned area depicted in FIG. 8.

With reference to FIG. 8, in another exemplary embodiment, an unpatterned area 802 is maintained adjacent to the structure to be examined (e.g., structure 102). With reference to FIG. 9, after positioning coupling element 118 on alignment structure 702, gap height 902 can be determined using any known thin film technique, such as ellipsometry or reflectometry. In this manner, variations in the height of alignment structure 702 resulting from the process used to form alignment structure 702 can be taken into account in determining gap height 902. Note that gap height 902 is defined between the surface of coupling element 118 facing structure 102 and the base of structure 102.

It should be recognized that the gap height can be determined using unpatterned area 802 without using alignment structure 702. More particularly, unpatterned area 802 is formed adjacent to structure 702, then coupling element 118 is positioned to establish a desired gap height without using alignment structure 702. The gap height is then determined from unpatterned area 802 using any known thin film technique, such as ellipsometry or reflectometry.

7. Simulations of Optical Metrology with Coupling Element

To illustrate the concepts described above, the following describes simulations of optical metrology performed using a coupling element. More particularly, the following describes simulations of angled resolved scatterometry and spectral scatterometry using a coupling element. It should be recognized, however, that the particular parameters and specifications used in performing the simulations described below are exemplary and can be varied depending on the application.

A. Angle Resolved Scatterometry

Angle resolved scatterometry (ARS) uses optical signatures, which are response curves of intensity (or other measures such as tan $\psi$ and cos $\delta$) versus the incident polar angle. Sharp peaks or dips in the optical signatures are typically referred to as anomalies. Anomalies occur mainly when a diffraction order either in reflection or transmission changes its state from propagative to evanescent or vice versa resulting in a "remix" of the remaining propagative orders. In general, the optical signatures indicate increased sensitivity near these anomalies. However, with increasing wavelength to pitch ($\lambda/p$) ratio, more and more anomalies fall outside the covered angle range. Thus the signatures become smoother and smoother with shrinking features, which results in reduced sensitivity and ultimately in reduced measurement accuracy.

For example, consider a binary resist on silicon pattern having a pitch of 300 nm and being illuminated by a beam with $\lambda=400$ nm during an angular scan from 0 thru 50 degrees. According to equation (1), the minus first reflection order propagates for incident angles in excess of about 20 degrees. Consequently, energy is redistributed from the specular reflex to this order. FIG. 10 illustrates modeled optical signatures of specular intensities in TE and TM polarization vs. the incidence angle for a basic grating (150 nm CD) and ±2% deviation.

Sensitivity can be assessed using a sensitivity metric, which is defined as:

$$M(x) = \sqrt{\frac{\sum_{i=1}^{N}(y_i - \bar{y})^2}{N-1}} \qquad (8)$$

with x being the measuring parameter, i.e., either θ in the ARS-case or λ in the spectral case. The value y is the measured entity, e.g., the intensity and N is the number of data points. The average $M_a$ of M(x) expresses the overall sensitivity. The $M_a$ values for the 300 nm pitch geometry are approximately 0.28 for TE and 0.42 for TM.

Now assume that the pitch is reduced to 200 nm, i.e., the pattern becomes a zero-order grating for the probing wavelength. FIG. 11 illustrates modeled optical signatures of specular intensities in TE and TM polarization vs. the incidence angle. As can be seen from by FIG. 10 in comparison to FIG. 11, the optical signatures in FIG. 11 are relatively smooth compared to the optical signatures in FIG. 10, which indicates reduced sensitivity ($M_a$=0.11 and 0.37 for TE and TM, respectively).

This reduction in sensitivity van be reversed using a coupling element. More particularly, FIG. 12 illustrates modeled optical signatures for a coupling element 118 (FIG. 3A) with a refraction index of 1.5 and a gap 302 (FIG. 3A) filled with air with the coupling element 118 (FIG. 3A) in contact with the structure, which correspond to the 3:2 shrinking ratio of the pitch. As can be seen from FIG. 12, the anomalies present in FIG. 10, which were not present in FIG. 11, are shifted back in the accessible angular range in FIG. 12.

Note that in the present example the selection of the index resulted in the anomalies occurring at approximately the same angular location in FIG. 12 as in FIG. 10. Additionally, note that the averaged sensitivities exceed those of the 300 nm grating (TE: 0.54 and TM: 0.58). FIG. 13 illustrates the averaged sensitivity values $M_a$ for the examples described above (i.e., the 300 nm pitch, the 200 nm pitch, and the 200 nm pitch using a coupling element).

B. Spectral Scatterometry

A similar approach can be taken for spectral scatterometry. For the sake of comparison, the same pattern as described above is modeled with a wavelength variation from 350 through 700 nm at 20 degrees incidence.

FIG. 14 illustrates modeled optical signatures for the 300 nm pitch. FIG. 15 illustrates modeled optical signatures for the 200 nm pitch. As can be seen from a comparison of FIGS. 14 and 15, the anomalies present in the optical signatures for the 300 nm pitch are not present in the optical signatures for the 200 nm pitch. This is because the anomaly is shifted to shorter wavelength outside the accessible wavelength range. The cutoff wavelength for the minus first order can be computed using a grating equation. For the assumed 20 degrees incidence, it is about 268 nm.

FIG. 16 illustrates modeled optical signatures for a coupling element 118 (FIG. 3A) with a reflection index of 1.5 and a gap 302 (FIG. 3A) filled with air and with coupling element 118 (FIG. 3A) in contact with the structure. As can be seen from FIG. 16, the anomalies are shifted back into the accessible wavelength range or in other words, the effective wavelength range is reduced from 350 . . . 700 to 233 . . . 466 with the anomalies at about 266 nm. In this manner, the cutoff wavelength has become accessible again.

FIG. 17 illustrates the averaged sensitivity values for the examples described above across the entire accessible wavelength range. FIG. 18 illustrates the averaged sensitivity values for the examples described above over the more sensitive short wavelength range (i.e., from 350 through 500 nm). As can be seen from FIG. 18 in comparison to FIG. 17, the increased sensitivity in both TM and TE is more pronounced over the more sensitive short wavelength range than the entire accessible wavelength range.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching.

I claim:

1. A resolution enhanced optical metrology system to examine a structure formed on a side of a semiconductor wafer, the system comprising:
    a source configured to direct an incident beam at the structure,
    wherein the incident beam has a wavelength;
    a coupling element configured to be disposed between the source and the structure with the coupling element facing the side of the semiconductor wafer on which the structure is formed,
    wherein a gap, having a gap height, is defined between the coupling element and the structure when the coupling element is disposed between the source and the structure, and
    wherein the wavelength of the incident beam is greater than the gap height; and
    a diffractive element configured to disperse the incident beam, wherein the diffractive element is disposed between the coupling element and the structure, wherein the diffractive element has a pitch, wherein the structure has a pitch, and wherein the pitch of the diffractive element is adapted to the pitch of the structure.

2. The system of claim 1, wherein the coupling element is a coupling lens.

3. The system of claim 1, wherein the structure has a top surface and a base, wherein the gap is defined between a bottom surface of the coupling element and the base of the structure, and wherein the coupling element can contact the top surface of the structure.

4. The system of claim 1, wherein the gap is filled with a liquid medium.

5. The system of claim 4, wherein the liquid medium and the coupling element have refraction indices that are approximately the same.

6. The system of claim 1, wherein the gap is filled with a gas medium.

7. The system of claim 6, wherein the gas medium and the coupling element have refraction indices that are approximately the same.

8. The system of claim 1, wherein the pitch of the diffractive element is approximately the same as the pitch of the structure.

9. The system of claim 1, wherein a ratio between the pitch of the diffractive element and the pitch of the structure is approximately an integer.

10. The system of claim 1 further comprising:
    an assembly having two or more diffractive elements,
    wherein a first diffractive element has a first pitch, and
    wherein a second diffractive element has a pitch different than the first pitch.

11. The system of claim 1 further comprising:
an unpatterned area adjacent to the structure,
wherein the gap height is determined using the unpatterned area.

12. The system of claim 1, wherein the diffractive element is coupled to the coupling element.

13. A resolution enhanced optical metrology system to examine a structure formed on a side of a semiconductor wafer, the system comprising:
a source configured to direct an incident beam at the structure,
wherein the incident beam has a wavelength;
a coupling element configured to be disposed between the source and the structure with the coupling element facing the side of the semiconductor wafer on which the structure is formed, wherein the coupling element is a coupling prism,
wherein a gap, having a gap height, is defined between the coupling element and the structure when the coupling element is disposed between the source and the structure, and
wherein the wavelength of the incident beam is greater than the gap height; and
a diffractive element configured to disperse the incident beam, wherein the diffractive element is disposed between the coupling element and the structure.

14. A resolution enhanced optical metrology system to examine a structure formed on a side of a semiconductor wafer, the system comprising:
a source configured to direct an incident beam at the structure,
wherein the incident beam has a wavelength;
a coupling element configured to be disposed between the source and the structure with the coupling element facing the side of the semiconductor wafer on which the structure is formed,
wherein a gap, having a gap height, is defined between the coupling element and the structure when the coupling element is disposed between the source and the structure, and
wherein the wavelength of the incident beam is greater than the gap height;
a diffractive element configured to disperse the incident beam, wherein the diffractive element is disposed between the coupling element and the structure; and
an alignment structure formed adjacent to the structure having a height, wherein the height of the alignment structure corresponds to the gap height.

15. A resolution enhanced optical metrology system to examine a structure formed on a side of a semiconductor wafer, the system comprising:
a source configured to direct an incident beam at the structure,
wherein the incident beam has a wavelength;
a coupling element configured to be disposed between the source and the structure with the coupling element facing the side of the semiconductor wafer on which the structure is formed,
wherein a gap, having a gap height, is defined between the coupling element and the structure when the coupling element is disposed between the source and the structure, and
wherein the wavelength of the incident beam is greater than the gap height;
a diffractive element configured to disperse the incident beam, wherein the diffractive element is disposed between the coupling element and the structure; and
a detector configured to receive a diffracted beam from the structure,
wherein the diffracted beam results from the incident beam diffracting from the structure,
wherein a measured diffraction signal is generated based on the diffracted beam,
wherein the measured diffraction signal is compared to a simulated diffraction signal to determine a profile of the structure, and
wherein the simulated diffraction signal is generated for a hypothetical profile of the structure being illuminated by the incident beam through the coupling element.

16. The system of claim 15 further comprising:
a library of simulated diffraction signals,
wherein a first simulated diffraction signal in the library corresponds to a first hypothetical profile, and
wherein a second simulated diffraction signal in the library corresponds to a second hypothetical profile different than the first hypothetical profile.

17. The system of claim 15, wherein if the measured diffraction signal and the simulated diffraction signal do not match within a matching criterion, a different simulated diffraction signal is generated for a different hypothetical profile of the structure.

18. A resolution enhanced optical metrology system to examine a structure formed on a side of a semiconductor wafer, the system comprising:
a source configured to direct an incident beam at the structure;
a coupling element configured to be disposed between the source and the structure with the coupling element facing the side of the semiconductor wafer on which the structure is formed,
wherein a gap, having a gap height, is defined between the coupling element and the structure when the coupling element is disposed between the source and the structure,
wherein the wavelength of the incident beam is greater than the gap height,
wherein the coupling element comprises a diffractive element configured to disperse the incident beam,
wherein the diffractive element has a pitch, wherein the structure has a pitch, and wherein the pitch of the diffractive element is adapted to the pitch of the structure;
a detector configured to receive a diffracted beam resulting from the incident beam diffracting from the structure and to generate a measured diffraction signal based on the received diffraction beam; and
a processor configured to process the measured diffraction signal to determine a profile of the structure.

19. The system of claim 18, further comprising:
a diffractive element configured to disperse the incident beam, wherein the diffractive element is coupled to the coupling element, and wherein the diffractive element is disposed between the coupling element and the structure.

20. The system of claim 18, wherein the gap is filled with a liquid medium.

21. The system of claim 20, wherein the liquid medium and the coupling element have refraction indices that are approximately the same.

22. The system of claim 18, wherein the gap is filled with a gas medium.

23. The system of claim 22, wherein the gas medium and the coupling element have refraction indices that are approximately the same.

24. The system of claim 18, wherein the pitch of the diffractive element is approximately the same as the pitch of the structure.

25. The system of claim 18, wherein a ratio between the pitch of the diffractive element and the pitch of the structure is approximately an integer.

26. The system of claim 18 further comprising:
an assembly having two or more diffractive elements,
wherein a first diffractive element has a first pitch, and
wherein a second diffractive element has, a second pitch different than the first pitch.

27. The system of claim 18 further comprising:
an unpatterned area adjacent to the structure,
wherein the gap height is determined using the unpatterned area.

28. A resolution enhanced optical metrology system to examine a structure formed on a side of a semiconductor wafer, the system comprising:
a source configured to direct an incident beam at the structure;
a coupling element configured to be disposed between the source and the structure with the coupling element facing the side of the semiconductor wafer on which the structure is formed,
wherein a gap, having a gap height, is defined between the coupling element and the structure when the coupling element is disposed between the source and the structure, and
wherein the wavelength of the incident beam is greater than the gap height;
a detector configured to receive a diffracted beam resulting from the incident beam diffracting from the structure and to generate a measured diffraction signal based on the received diffraction beam;
a processor configured to process the measured diffraction signal to determine a profile of the structure; and
an alignment structure formed adjacent to the structure having a height, wherein the height of the alignment structure corresponds to the gap height.

29. A resolution enhanced optical metrology system to examine a structure formed on a side of a semiconductor wafer, the system comprising:
a source configured to direct an incident beam at the structure;
a coupling element configured to be disposed between the source and the structure with the coupling element facing the side of the semiconductor wafer on which the structure is formed,
wherein a gap, having a gap height, is defined between the coupling element and the structure when the coupling element is disposed between the source and the structure, and
wherein the wavelength of the incident beam is wrester than the gap height;
a detector configured to receive a diffracted beam resulting from the incident beam diffracting from the structure and to generate a measured diffraction signal based on the received diffraction beam;
a processor configured to process the measured diffraction signal to determine a profile of the structure,
wherein the processor is configured to obtain a measured diffraction signal based on the received diffracted beam and to compare the measured diffraction signal to a simulated diffraction signal to determine the profile of the structure, and
wherein the simulated diffraction signal is generated for a hypothetical profile of the structure being illuminated by the incident beam through the coupling element.

30. The system of claim 29 further comprising:
a library of simulated diffraction signals,
wherein a first simulated diffraction signal in the library corresponds to a first hypothetical profile, and
wherein a second simulated diffraction signal in the library corresponds to a second hypothetical profile different than the first hypothetical profile.

31. The system of claim 29, wherein if the measured diffraction signal and the simulated diffraction signal do not match within a matching criterion, the processor generates a different simulated diffraction signal for a different hypothetical profile of the structure.

32. A method of examining a structure formed on a side of a semiconductor wafer using a resolution enhanced optical metrology system, the method comprising:
directing an incident beam at the structure through a coupling element,
wherein the coupling element is configured to be disposed between the source and the structure with the coupling element facing the side of the semiconductor wafer on which the structure is formed, and
wherein a gap, having a gap height, is defined between the coupling element and the structure when the coupling element is disposed between the source and the structure,
wherein the wavelength of the incident beam is greater than the gap height,
wherein the coupling element comprises a diffractive element configured to disperse the incident beam,
wherein the diffractive element has a pitch, wherein the structure has a pitch, and wherein the pitch of the diffractive element is adapted in the pitch of the structure;
receiving a diffracted beam resulting from the incident beam diffracting from the structure;
generating a measured diffraction signal based on the measured diffraction beam; and
processing the measured diffraction signal to determine a profile of the structure.

33. The method of claim 32, wherein the gap is filled with a liquid medium.

34. The method of claim 33, wherein the liquid medium and the coupling element have refraction indices that are approximately the same.

35. The method of claim 32, wherein the gap is filled with a gas medium.

36. The method of claim 35, wherein the gas medium and the coupling element have refraction indices that are approximately the same.

37. The method of claim 32, wherein the pitch of the diffractive element is approximately the same as the pitch of the structure.

38. The method of claim 32, wherein a ratio between the pitch of the diffractive element and the pitch of the structure is approximately an integer.

39. The method of claim 32 further comprising:
selecting the diffractive element from an assembly having two or more diffractive elements,
wherein a first diffractive element on the assembly has a first pitch, and
wherein a second diffractive element on the assembly has a second pitch different than the first pitch.

40. The method of claim 32 further comprising:
before directing the incident beam at the structure, determining the gap height using an unpatterned area adjacent to the structure.

41. The method of claim 32, wherein the incident beam is directed through a diffractive element after being directed through the coupling element.

42. A method of examining a structure formed on a side of a semiconductor wafer using a resolution enhanced optical metrology system, the method comprising:
directing an incident beam at the structure through a coupling element,
wherein the coupling element is configured to be disposed between the source and the structure with the coupling element facing the side of the semiconductor wafer on which the structure is formed, and
wherein a gap, having a gap height, is defined between the coupling element and the structure when the coupling element is disposed between the source and the structure, and
wherein the wavelength of the incident beam is greater than the gap height;
receiving a diffracted beam resulting from the incident beam diffracting from the structure;
generating a measured diffraction signal based on the measured diffraction beam;
processing the measured diffraction signal to determine a profile of the structure; and
before directing the incident beam at the structure, positioning the coupling element on an alignment structure formed adjacent to the structure having a height,
wherein the height of the alignment structure corresponds to the gap height.

43. A method of examining a structure formed on a side of a semiconductor wafer using a resolution enhanced optical metrology system, the method comprising:
directing an incident beam at the structure through a coupling element,
wherein the coupling element is configured to be disposed between the source and the structure with the coupling element facing the side of the semiconductor wafer on which the structure is formed, and
wherein a gap, having a gap height, is defined between the coupling element and the structure when the coupling element is disposed between the source and the structure, and
wherein the wavelength of the incident beam is greater than the gap height;
receiving a diffracted beam resulting from the incident beam diffracting from the structure;
generating a measured diffraction signal based on the measured diffraction beam; and
processing the measured diffraction signal to determine a profile of the structure, wherein processing comprises:
obtaining a measured diffraction signal based on the received diffracted beam; and
comparing the measured diffraction signal to a simulated diffraction signal to determine the profile of the structure,
wherein the simulated diffraction signal is generated for a hypothetical profile of the structure being illuminated by the incident beam through the coupling element.

44. The method of claim 43,
wherein the simulated diffraction signal is obtained from a library of simulated diffraction signals,
wherein a first simulated diffraction signal in the library corresponds to a first hypothetical profile, and
wherein a second simulated diffraction signal in the library corresponds to a second hypothetical profile different than the first hypothetical profile.

45. The method of claim 43, wherein if the measured diffraction signal and the simulated diffraction signal do not match within a matching criterion, generating a different simulated diffraction signal for a different hypothetical profile of the structure.

\* \* \* \* \*